J. H. RAND, Jr.
FILE, INDEX, OR THE LIKE.
APPLICATION FILED FEB. 16, 1917.
1,358,463.
Patented Nov. 9, 1920.
2 SHEETS—SHEET 1.
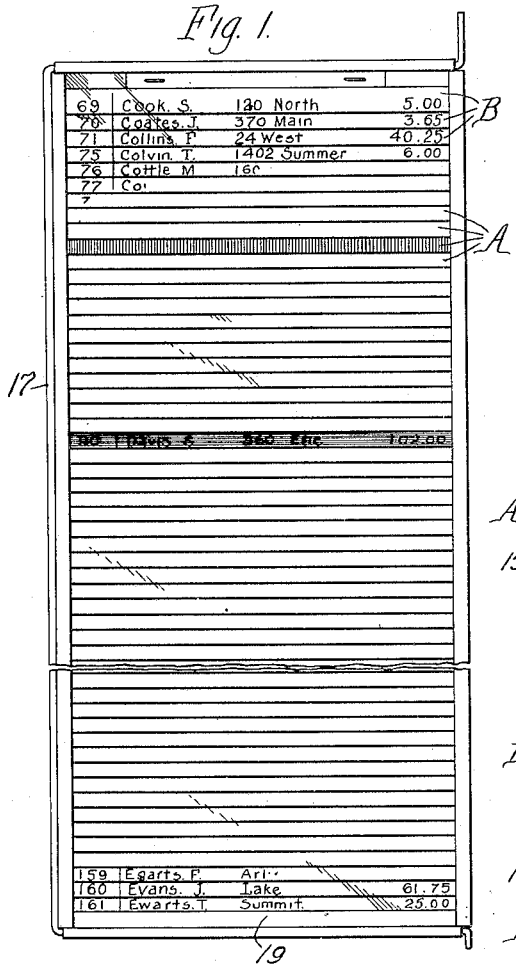
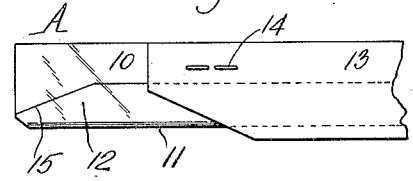
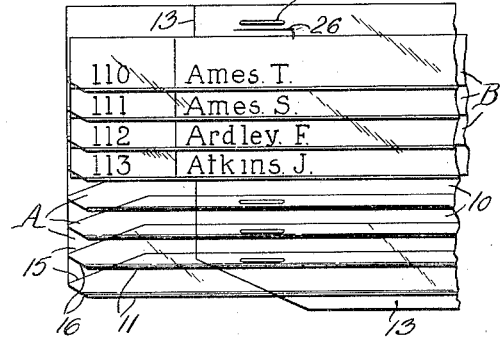
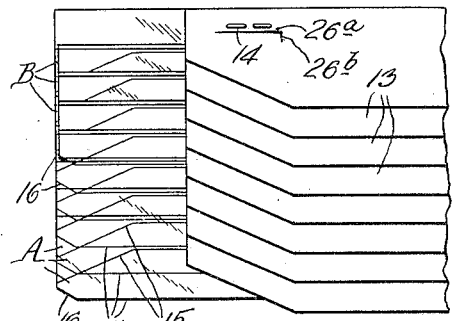
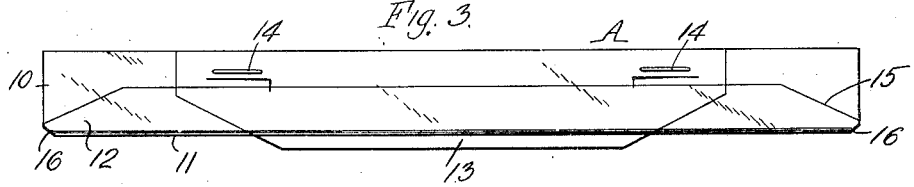
Inventor.
James H. Rand Jr.
by Wilhelm & Parker.
Attorneys.

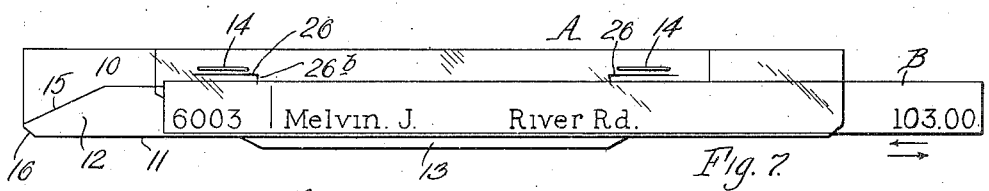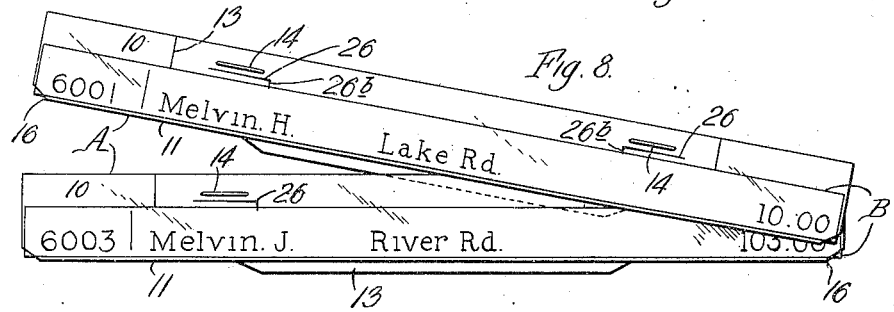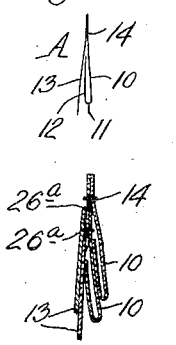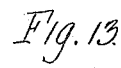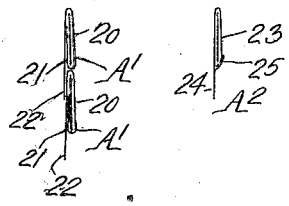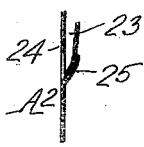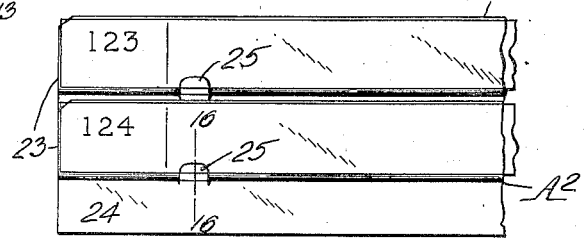

UNITED STATES PATENT OFFICE.

JAMES H. RAND, JR., OF TONAWANDA, NEW YORK, ASSIGNOR TO ZENITH SYSTEMS CORPORATION, OF TONAWANDA, NEW YORK.

FILE, INDEX, OR THE LIKE.

1,358,463.     Specification of Letters Patent.     Patented Nov. 9, 1920.

Application filed February 16, 1917. Serial No. 149,132.

*To all whom it may concern:*

Be it known that I, JAMES H. RAND, Jr., a citizen of the United States, residing at Tonawanda, in the county of Erie and State of New York, have invented a new and useful Improvement in Files, Indexes, or the like, of which the following is a specification.

This invention relates to a file, index, directory, or other exhibitor in which slips of paper or the like bearing information are inserted in transparent tubes or sheaths by which they are retained in a desired order and displayed for ready reference while being inclosed and protected. Such tubes or sheaths are ordinarily made in whole or in part from thin strips of celluloid and are retained in parallel relation, side by side, in a supporting frame or device. The tubes or sheaths heretofore used for this purpose have no provision for causing them to interlock with each other, and as the tubes are thin and have rounded edges, they are apt to slip past each other in the supporting frame or device or become displaced. The tubes or sheaths are also apt to warp or spring out of engagement with the confining channels or parts on the supporting frame or device. Furthermore, as the tubes or sheaths are entirely independent of each other and are small, they cannot be conveniently handled in groups, but must be separately inserted in and removed from the supporting frame or device.

One object of this invention is to construct the transparent tubes or sheaths for such devices so that they will interlock and thereby mutually co-act in retaining the tubes or sheaths in the intended relation and prevent the accidental displacement of the same from the supporting frame or device. Another object of the invention is to interlock the tubes or sheaths in such manner that they can be readily inserted and removed from the supporting frame or device either singly or in groups of any desired number, but so that such sheath or group of sheaths cannot be removed without first shifting the same out of interlocking engagement with the adjacent tube or tubes. Another object of the invention is to construct the tubes or sheaths so that they are inexpensive to manufacture and so that the reference slips can be readily inserted into and removed from the tubes or sheaths and will be properly retained in position therein. By constructing the tubes or sheaths to interlock, as explained, they are prevented from slipping past each other or out of place even when a group of the tubes or sheaths is held in the hand out of the supporting device, and any desired number of the sheaths can be readily and conveniently handled as a group or unit.

In the accompanying drawings, tubes or sheaths of different constructions and arrangements embodying the invention are illustrated.

Figure 1 is a front elevation, on a reduced scale, of an index, directory, or the like comprising tubes or sheaths of one construction embodying the invention.

Fig. 2 is a transverse section, full size, thereof.

Fig. 3 is a front elevation, full size, of one of the tubes or sheaths detached.

Fig. 4 is a fragmentary rear elevation thereof.

Fig. 5 is a fragmentary front elevation of a group of eight of the tubes or sheaths, reference strips being shown in four of the sheaths.

Fig. 6 is a fragmentary rear elevation of said group of tubes or sheaths.

Fig. 7 is a front elevation of a sheath showing the reference strip partially withdrawn.

Fig. 8 is a front elevation of two of the sheaths showing how they interlock.

Fig. 9 is a cross-section of one of the sheaths.

Fig. 10 is a similar view of the sheath with a reference strip therein.

Fig. 11 is a similar view of several of the sheaths interlocked.

Fig. 12 is a front elevation, on a reduced scale, showing an inverted arrangement of the sheaths or tubes.

Figs. 13 and 14 are cross sections of sheaths of two different modified constructions.

Fig. 15 is a front elevation of two of the sheaths shown in Fig. 14.

Fig. 16 is a cross-section enlarged on line 16—16, Fig. 15.

Figs. 17 and 18 are respectively a front elevation and section showing the use of a spacer between two adjacent sheaths.

In the construction shown in Figs. 1 to 11 of the drawings, each of the tubes or sheaths A consists of a thin strip 10 of suitable transparent material, such as sheet celluloid, which has one edge folded back upon itself along the line 11, forming a back wall or flange 12, and a strip 13 of cardboard or stiff paper which is secured by staples 14 or by any other suitable means on the rear side of the celluloid strip 10 above the flange 12 thereof. This cardboard or paper strip 13 extends down behind the upwardly folded flange 12 of the celluloid strip, and preferably somewhat below the lower folded edge of the celluloid strip 10, forming a back strip or tongue for interlocking with the adjacent tube or sheath. An open ended sheath or pocket having a transparent front wall is thus formed into which a reference strip B bearing information on its front face is adapted to be inserted endwise. The reference slip is located between the front wall and upturned flange 12 of the sheath and is confined vertically between the folded lower edge of the sheath and the staples or fastening means 14. The matter on the slip can be read through the transparent front wall of the sheath. The tongue or back strip 13 can be co-extensive in length with the sheath, or shorter, as desired, the latter form being shown in the drawings.

When the sheaths with the reference slips therein are interlocked with the upper edge of one sheath between the tongue and the body of the next sheath (see Figs. 1 and 5,) the tongues are hidden from sight. There is therefore no necessity for making the tongues of celluloid, and the paper or cardboard tongues 13, which are cheaper and preferable in some respects, are therefore employed. The staples or fastening means 14 serve as stops to limit the extent to which one sheath can be shoved in between the body and tongue of the next sheath. The sheath could, however, if desired, be made entirely of celluloid constructed just as described, or made from a single piece of celluloid folded to provide the parts in the same relation.

The reference slips are preferably made from sheets of suitable paper weakened on parallel lines by scoring, perforating or the like. The desired information is typewritten on the sheet between the weakened lines and the slips then torn off on the lines. In order to facilitate the insertion of the reference slip into the sheath, the opposite ends of the upwardly folded flange 12 are preferably cut off diagonally as shown at 15. This construction enables the reference slip to be placed against the rear face of the front wall of the sheath beyond the diagonal edge of the flange and then readily slipped endwise into the sheath. The lower corners of the sheath are also preferably cut off diagonally as shown at 16 so that when the slip is in position in the sheath, the lower corners of the slip will project beyond the cut-off ends of the sheath and can be readily grasped for pulling out the slip.

The upper edge of each sheath or tube is adapted to be inserted between the lower edge of the body and the tongue of the next tube or sheath above, the sheaths being thus prevented from disengagement except by moving one of the tubes or sheaths upwardly or downwardly out of engagement with the next tube or sheath. The tubes or sheaths are retained in this interlocking relationship on a supporting frame 17 or device which is preferably provided at opposite edges with flanges forming inwardly facing channels or grooves 18 into which the ends of the tubes or sheaths extend. A double frame is shown on both sides of which the tubes or sheaths are adapted to be retained in the manner explained. The sheaths can be readily placed in position on the frame by bowing or springing the sheaths so as to permit their ends to be placed between the edge flanges of the frame and to spring into the retaining grooves 18 when the sheaths are permitted to resume their straight condition. When the frame or supporting device has been filled with the interlocked tubes or sheaths as indicated in Fig. 1, the tubes or sheaths cannot be removed without first removing the lowermost tube or sheath or a suitable locking strip or device 19 at the bottom of the frame 17. After the locking strip or lowermost sheath has been removed, any desired tube or sheath can then be removed by sliding the tubes or sheaths below the same downwardly in the frame so as to disengage the desired tube or sheath from the adjacent one with which it interlocks. A single sheath, or a group of any desired number of sheaths can be removed in this way and replaced, and after the sheaths have been placed in position and the bottom sheath or locking strip 19 put in place, all of the sheaths will be properly retained in their intended position. In a similar manner a desired sheath or group of sheaths could be removed from the frame by first removing a sheath or locking strip at the top of the frame and raising the sheaths which are located above the desired sheath or group. The interlocking engagement of the sheaths makes it possible to handle a number of the sheaths in a group or as a unit without danger of the sheaths in the group being disarranged.

Instead of arranging the sheaths as explained with the upper edge of one sheath extending between the body and tongue of the next sheath above, they could, if desired, be arranged in inverted position in the frame, as shown in Fig. 12; that is, with the lower edge of one sheath engaged between the body and tongue of the next lower sheath. With such an arrangement a desired sheath or group of sheaths could be readily removed by first removing the top sheath in the frame and raising the sheaths above the one or group desired.

Tubes or sheaths of various other constructions adapted to interlock as described could be employed. For instance, Fig. 13 shows a sheath A' formed from a single strip of celluloid folded to form a front wall 20, an upturned flange 21, and a depending back strip or tongue 22. These sheaths are arranged in the frame or support with the tongue 22 of one sheath extending down behind the next lower sheath, so that each sheath acts to prevent the displacement of the next sheath. This construction is practically like that first described except that the tongue is formed in one integral piece with the body of the sheath and the staples used in the first construction are omitted. Staples located as in the first construction could, however, be employed if desired, in which case the sheaths could be assembled, as in the first construction, with one edge of one sheath engaged between the body and tongue of the next sheath.

Figs. 14 to 16 show still another form of sheath A² in which the body or pocket 23 for the reference slip is formed by folding downwardly the upper portion of the celluloid strip and bending the lower edge of this folded part inwardly against the back or tongue 24. The lower edge of the pocket is prevented from opening and the reference slip from falling out by punching out from the back or tongue 24, small lugs 25 which engage the lower edge of the front wall of the pocket and hold it against the back or tongue 24. The sheaths of this form are assembled in the frame with the tongue of one sheath extending down behind the next lower sheath.

The tubes or sheaths can, if desired, be made in contrasting colors, each having a particular significance in connection with the reference slip contained therein. For example, when the device is used for an account index, a red sheath could be used to signify a dangerous or bad account. A green sheath could be used to indicate an account having to be referred to the credit manager, etc.

In a construction, such as described, in which the tongue and body of the sheaths are fastened together by staples 14, the parts are more or less tightly pinched together by the staples, and the margin of one sheath might wedge between the body and tongue of the next sheath so as to stick to an objectionable extent. In order to prevent this, slits are provided adjacent to and parallel with the staples 14, either in the tongue 13 or celluloid strip 10. Figs. 5, 7 and 8 show such slits at 26 in the celluloid front strip 10 and Figs. 6 and 11 show the slits at 26ᵃ in the tongue 13. The slits are preferably made with an angular extension 26ᵇ at one end. When one sheath is interlocked with another the staples will hold the portions of the slit strip at the near side of the slits in close contact with the attached strip while the portions of the slit strip at the far sides of the slits will give or yield somewhat. The edge of the inserted sheath will therefore strike the edges of the slits next to the staples and these edges will act as stops to positively limit the extent to which the sheath can be inserted and prevent the sheaths from wedging together.

The sheaths shown in Figs. 1–12 overlap so that only enough of each sheath is exposed to display a single line of reading matter on each reference slip. This permits the maximum number of sheaths to be arranged in a frame. The reference slips are, however, preferably made wide enough for two lines of reading matter and if it is desired to expose both lines of matter this can be done by inserting spacers 27 furnished for the purpose between adjacent sheaths as shown in Fig. 17. These spacers may consist each of a tongue and front strip stapled together like the parts of the sheaths or they may be of any other suitable construction adapted to interlock with and space the sheaths as shown, this front strip being narrow enough not to hide the slip in the underlying sheath.

The spacers 27 are placed in the file in the same way as the sheaths.

I claim as my invention:—

1. In a device of the character described, a series of open ended sheaths each adapted to receive and cover a separate reference slip and having transparent front walls through which matter on the slips can be read, and each having a thin longitudinal edge and a tongue at the rear of the body of said sheath extending from said thin edge toward the opposite edge of the sheath, and means for retaining said sheaths in parallel relation with the thin edge of each sheath extending between the body and the tongue of the next sheath.

2. A sheath for the purpose described consisting of a strip of transparent material folded upon itself at one edge to form an open ended pocket adapted to receive a removable reference slip, and a separate strip of material secured on the rear side of said transparent strip above said folded portion and forming a tongue in rear of said pocket for engagement with a similar sheath.

3. An elongated narrow sheath adapted to receive and cover a separate reference slip and having a transparent front wall through which matter on the reference slip can be read, a tongue at the rear of the sheath whereby a plurality of said sheaths can be interlocked with one edge of one sheath extending between the body and the tongue of the next sheath, and fastening means connecting said tongue and the body of the sheath, said fastening means being located between the longitudinal edges of said sheath and limiting the distance that the next sheath can extend between the body and tongue of the sheath.

4. A sheath adapted to contain a reference slip and having a transparent front wall through which matter on the slip can be read, and a tongue at the rear of the sheath whereby a plurality of said sheaths can be interlocked with one edge of one sheath extending between the body and the tongue of the next sheath, and a fastening device connecting said tongue and the body of the sheath, one of said connected parts having a slit adjacent said fastening device forming a stop for the next sheath.

5. A sheath adapted to contain a reference slip and having a transparent front wall through which matter on the slip can be read, and a tongue at the rear of said sheath whereby a plurality of said sheaths can be interlocked with one edge of one sheath extending between the body and the tongue of the next sheath, and a fastening device connecting said tongue and the body of the sheath, said tongue having a slit adjacent said fastening device forming a stop for the next sheath.

6. In a device of the character described, a plurality of sheaths each adapted to contain a reference slip and having a transparent front wall through which matter on the slip can be read, and having a tongue whereby said sheaths can be arranged in overlapped relation with the tongue of one sheath extending between the body and the tongue of the next sheath, and a sheath spacer constructed to be arranged between and interlocked with adjacent sheaths.

7. In a device of the character described, a plurality of sheaths each adapted to contain a reference slip and having a transparent front wall through which matter on the slip can be read, and having a tongue whereby said sheaths can be arranged in overlapped relation with the tongue of one sheath extending between the body and the tongue of the next sheath, and a sheath spacer comprising a strip having a tongue and adapted to be inserted between the body and the tongue of one sheath and to embrace one margin of the next sheath.

8. In a device of the character described, a series of sheath elements each adapted to receive and cover a separate reference slip and having a transparent front wall through which matter on the slip can be read, and having a part depending back of said sheath from the upper portion thereof, said elements being assembled with the upper portion of each element extending between the sheath and depending part of the next element, said sheath elements having stops between their edges which limit the distance that one sheath extends between the parts of the other sheath.

9. A sheath element for the purpose described consisting of a strip of transparent material folded rearwardly upon itself at one edge to form an open ended pocket adapted to receive and protect a separate reference slip and having an opposite unfolded edge, and a separate strip of thin material secured to the rear side of the unfolded portion of said first strip and extending beyond said folded portion to form a tongue for engagement with an adjacent sheath element.

10. A sheath element for the purpose described consisting of a flat strip of transparent material folded rearwardly upon itself at one edge only to form an open-ended pocket adapted to receive and protect a separate reference slip, the remainder of said transparent strip being unfolded, and a separate unfolded strip of thin material secured flat against the rear side of the unfolded portion of said first strip and extending beyond said folded portion to form a tongue for engagement with an adjacent sheath element.

Witness my hand this 30th day of January, 1917.

JAMES H. RAND, JR.

Witnesses:
 E. V. WARREN,
 PEARL KAYS.